Nov. 6, 1934.  C. BOUILLON  1,979,443
HEADSTOCK FOR LATHES
Filed Sept. 28, 1931  3 Sheets-Sheet 1

Patented Nov. 6, 1934

1,979,443

UNITED STATES PATENT OFFICE 1,979,443

HEADSTOCK FOR LATHES

Constant Bouillon, Torrington, Conn., assignor to The Hendey Machine Company, Torrington, Conn., a corporation of Connecticut Application September 28, 1931, Serial No. 565,412

4 Claims. (Cl. 82—30)

This invention relates to headstocks for lathes and machines of like character and more particularly to back gearing and step cone pulley mountings for rotating the work spindle of the headstock embodied in machines of this type.

In lathe headstocks provided with step-cone pulley driving means, it has been the conventional practice to provide the pulley with plain bearings freely rotatable and supported on the work driving spindle. The pulley is usually provided with four steps of varying diameters capable of producing a desired range of speeds when engaged with the work spindle.

To produce an additional range of speeds to the work spindle, the headstock is provided with back gearing which, when in engagement, is capable of doubling the number of speeds obtainable through the direct engagement of the step-cone pulley with the work spindle.

When utilizing the speeds obtainable through the direct engagement of the step-cone pulley, the number of revolutions of the pulley and work spindle are the same, both members rotating as one unit. When the pulley is driving the work spindle indirectly, through the back gearing, the pulley and work spindle are rotating at different speeds to one another according to the gear ratio employed.

The above construction and required arrangement of parts, due to the limitations of space and speed requirements, necessitated that the pulley, with a driving pinion attached thereto, be rotatably mounted directly on the work spindle with plain bearings. This construction is productive of excessive wear and friction when the headstock is operated excessively with the back gearing in engagement.

The usual headstock frame, having back gearing, is provided with back arms adapted to have rotatably mounted therein eccentric bearing bushings which have rotatably supported therein the opposed ends of the back gear quill. A connecting member extends freely through the quill and is secured in the opposed eccentric bushings so that they may be rotated in direct relation. Through a partial rotation of the eccentric bushings the back gearing is engaged and disengaged with the driving member.

Accordingly, the object of my present invention is to so construct and arrange the step-cone pulley and members associated therewith, as required in a headstock of the above referred to type, so as to permit the interpositioning of anti-friction bearings between the step-cone pulley and the work spindle. A further object is to provide an anti-friction bearing mounting, within eccentric housings, for the back gearing quill. With the above members so constructed and arranged I have reduced to a minimum the amount of effective wear and friction between the rotating members which is inherent and well known with the plain type of bearing.

With the above and other objects in view my invention comprises a novel combination and arrangement of parts hereinafter described and more specifically pointed out in the appended claims.

In the accompanying drawings I have shown my invention embodied in a step-cone pulley driven headstock provided with back gearing sufficient to enable those skilled in the art to understand the construction and operation thereof.

Referring to the drawings:—

Figure 1:
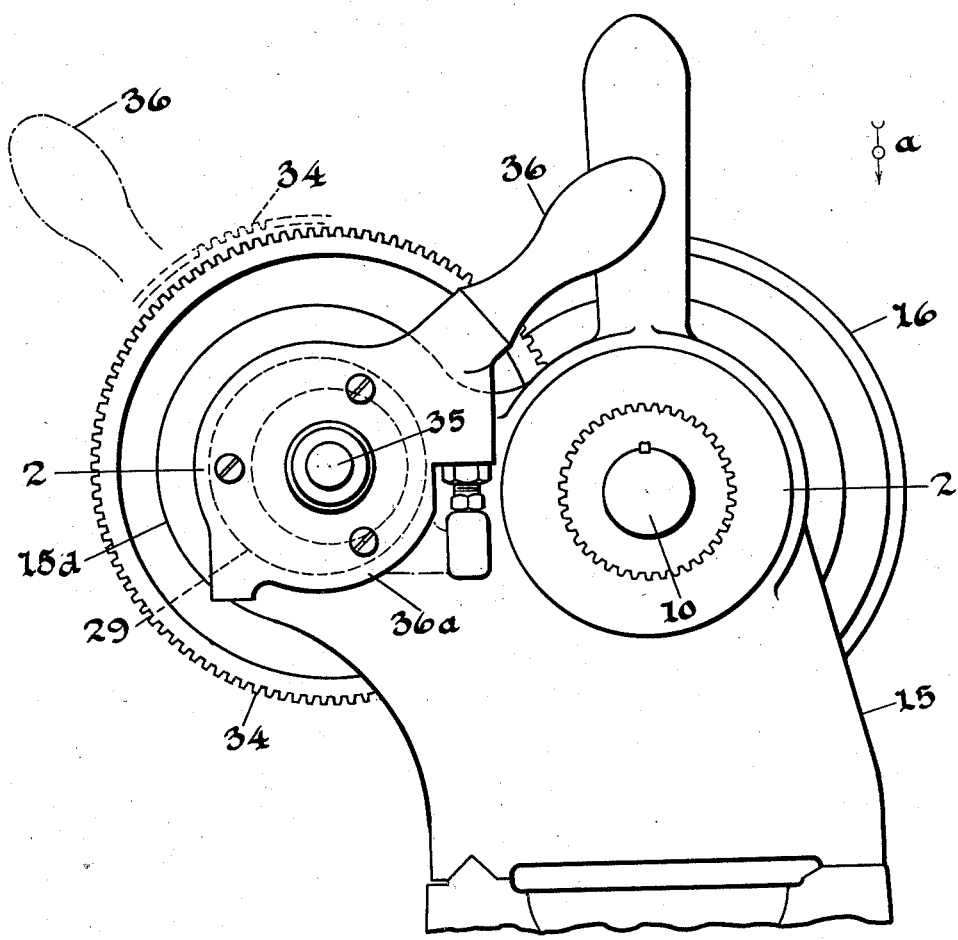
Fig. 1 is an end view of a cone driven lathe headstock provided with back gearing.

The work spindle 10 is rotatably mounted in suitable anti-friction bearings 11, 12, supported in the front main bearing housing 15a and 13, 14 in the rear main bearing housing 15b of the headstock frame 15.

The step-cone pulley 16 has secured therein a front bearing housing member 17, said member having formed therein a chamber 18 adapted to support the outer race of an anti-friction bearing 19, the inner race of said bearing 19 being mounted directly on the work spindle 10.

The reduced rear end of the pulley 16 has secured therein a bearing housing member 20, said member having formed integral therewith a pinion 21 and bearing housing 20a. The bearing housing 20a is adapted to support therein the outer race of the anti-friction bearing 22, the inner race of which is supported directly on the work spindle 10. A lock nut 23, engaging the internally threaded portion of the bearing housing 20a, retains the outer race of the bearing within the housing. A spacing sleeve 24 supported by the spindle 10 engages the inner faces of the inner races of the bearings 19, 22, and retains them in spaced relation. A spacer 25 engages the outer faces of the inner races of the bearings 13 and 22 to retain them in spaced relation. The outer face of the inner race of the bearing 19 is engaged by the hub face 26a of a gear 26 secured on the spindle 10, the opposite face of said gear hub engages the shouldered portion of said spindle. By means of the nut 27, adapted to be engaged by the threaded portion 10a of the spindle 10, the bearings 13, 14, 19 and 22 are adjusted longitudinally on the spindle 10.

Figure 3:
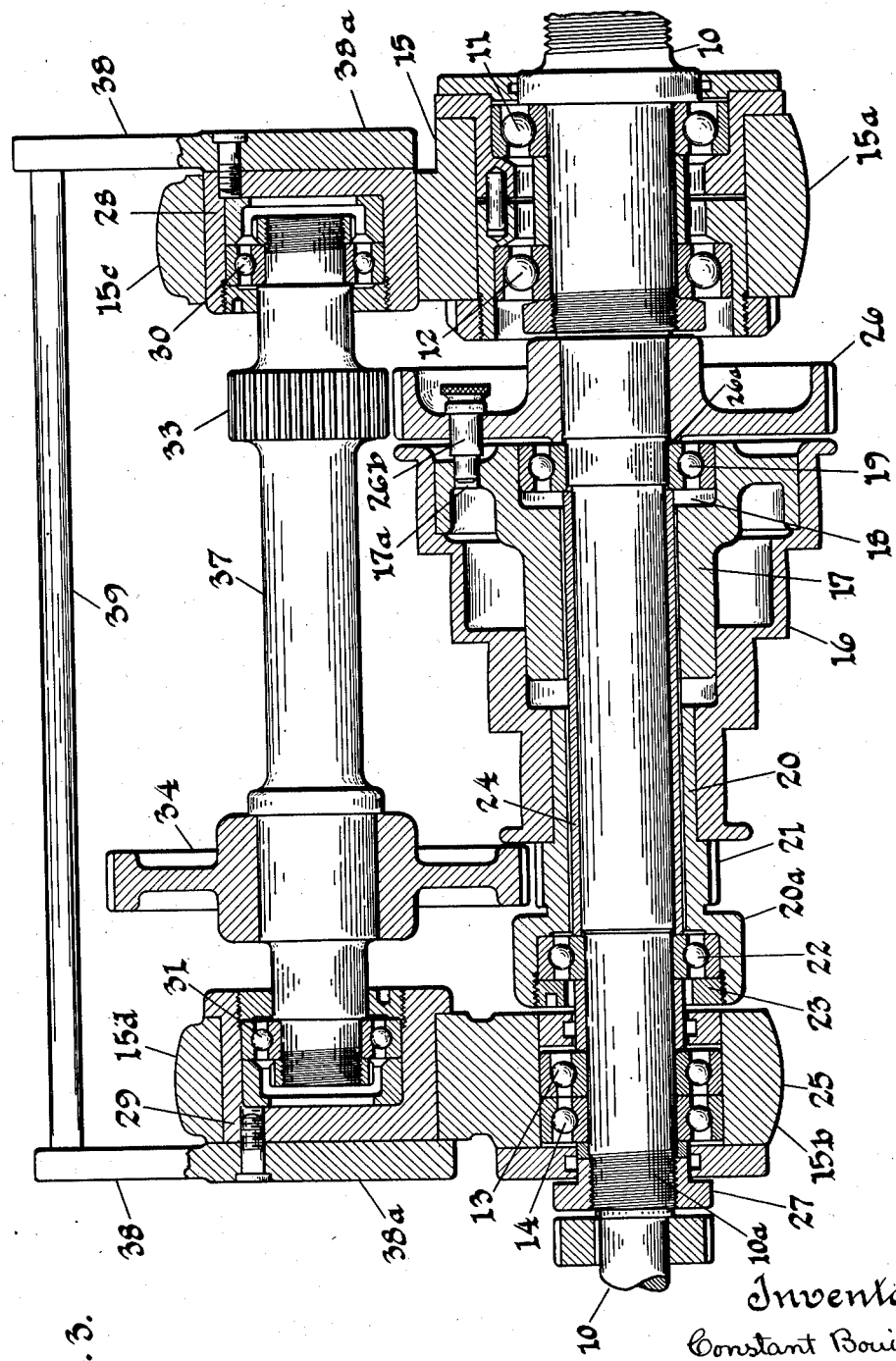
Fig. 3 is a view corresponding to Fig. 2, but shows the back gearing disengaged and with modified actuating means.

The gear 26 secured on the spindle 10 is provided with a pull pin 26b, the reduced end portion of which is adapted to engage a corresponding bore 17a in the pulley bushing 17, see Fig. 3.

The headstock frame 15 is provided with back arms 15c, 15d, having rotatably mounted therein eccentric bearing housings 28, 29 adapted to have secured therein the anti-friction bearings 30, 31. Said bearings are positioned within said housings 28, 29 against spacers 30a, 31a by means of lock nuts 30b, 31b which engage the threaded bore of said housings.

Supported in said bearings 30, 31 are the opposed ends of the back gearing quill 32, said quill having formed integral therewith a pinion 33 adapted to be engaged with the face gear 26.

Figure 2:
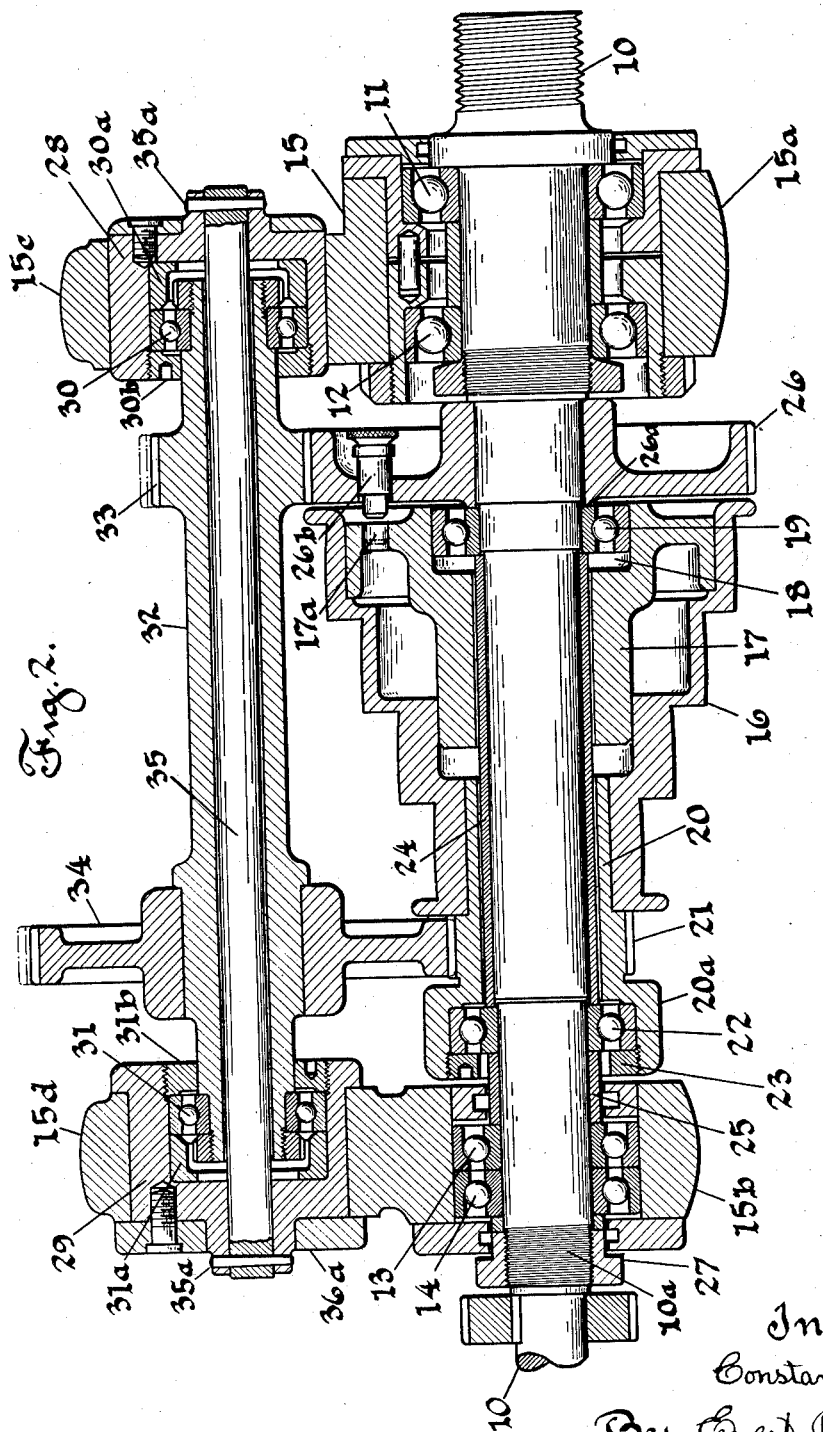
Fig. 2 is a longitudinal section taken substantially along line 2—2, Fig. 1, viewing in direction of arrow a, same figure.

The quill 32 has secured thereon a gear 34 adapted to be engaged with the pulley pinion 21. A stationary shaft 35 extends through said quill 32, the opposed ends of said shaft being secured in the eccentric housings 28, 29 with pins 35a. The eccentric housing 29 has secured thereto, the hub 36a of the back gearing operating lever 36 by which the back gearing may be engaged, as illustrated at Fig. 2 or disengaged, as shown at Fig. 3, the operation and effect of which is well known in the art therefore further detailed description is thought unnecessary.

At Fig. 3 I have shown a modified quill mounting and means for engaging the back gearing. In this modification the quill 37 may be solid with its opposed ends supported in the bearings 30, 31 rotatably mounted in the eccentric housings 28, 29. In this instance both housings 28, 29 have secured thereto the hub portions 38a of the levers 38, said levers being provided with, in this instance, a connecting rod 39 through which levers 38 and eccentric bushings 28, 29 are retained in their rotary positioned relation.

Having thus described my invention it will be evident that certain changes and modifications may be made therein by those skilled in the art without departing from the spirit and scope thereof, therefore, I do not wish to be limited to the specific details herein disclosed, but what I claim is:—

1. In a headstock, the combination of a front bearing and a rear bearing, a spindle rotatably mounted in said bearings, a pulley freely rotatable relative to said spindle, bearing housing members for said pulley, one of said bearing housings being adjacent to said pulley and extending therefrom with a pinion interposed between said housing and said pulley, anti-friction members retained in said housings and rotatably supported on said spindle, with means for engaging and disengaging said pulley with said spindle.

2. In a headstock, the combination of a front bearing and a rear bearing, a spindle rotatably mounted in said bearings, a pulley freely rotatable relative to said spindle, bearing housings for said pulley, one of said bearing housings being adjacent said pulley and extending therefrom, a pinion integral with said adjacent bearing housing and disposed between said bearing housing and said pulley, anti-friction members retained in said housings and rotatably supported on said spindle, with means for engaging and disengaging said pulley with said spindle.

3. In a headstock, the combination of a front bearing and a rear bearing, a spindle rotatably mounted in said bearings, a pulley freely rotatable relative to said spindle, a face gear secured to said spindle with means for engaging and disengaging said face gear with said pulley, bearing housings for said pulley, one of said bearing housings being adjacent said pulley and extending therefrom, a pinion integral with said adjacent bearing housing and disposed between said bearing and said pulley, anti-friction members adjustably retained in said housings and rotatably supported on said spindle, a quill having a gear and pinion thereon with means for engaging and disengaging said quill gear and pinion with said first pinion and face gear.

4. In a headstock, the combination of a front bearing and a rear bearing, a spindle rotatably mounted in said bearings, a pulley freely rotatable relative to said spindle, a face gear secured to said spindle with means for engaging and disengaging said face gear with said pulley, a pinion secured to said pulley; a quill having a gear and pinion secured thereon and adapted to be engaged with said first pinion and face gear, said quill comprising a sleeve, opposed bearing bushings for said ends, the outer periphery of said bushings being eccentric to the axis of said quill and the bearing ends thereof, with means for concomitantly rotating said bushings in suitable bushing supports.

CONSTANT BOUILLON.